Feb. 4, 1941.  E. E. ADAMS ET AL  2,230,580
MOTOR CAR
Original Filed March 26, 1934   7 Sheets-Sheet 4
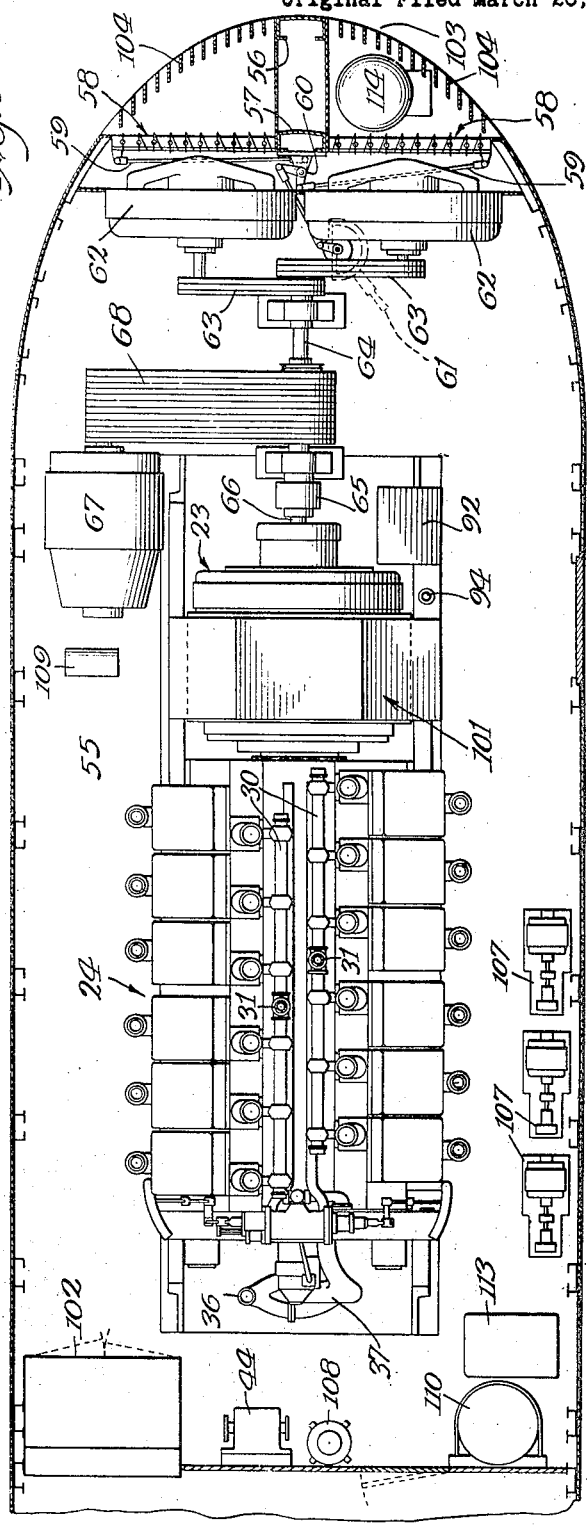
Inventors
E. Eugene Adams
William B. Stout
William H. Mussey
By Martin P. Blomberg
Gillson, Mann &Co
Attys.

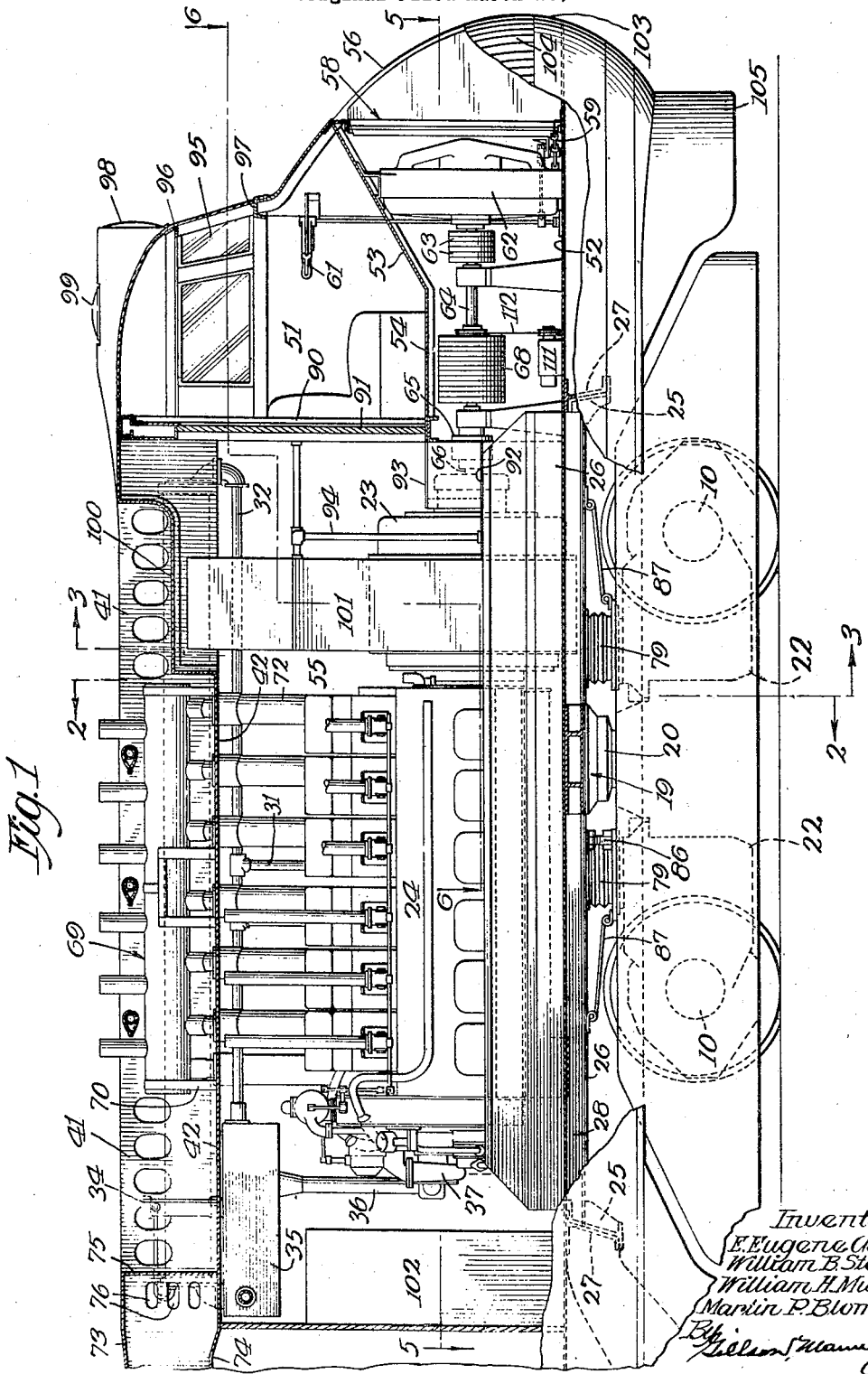

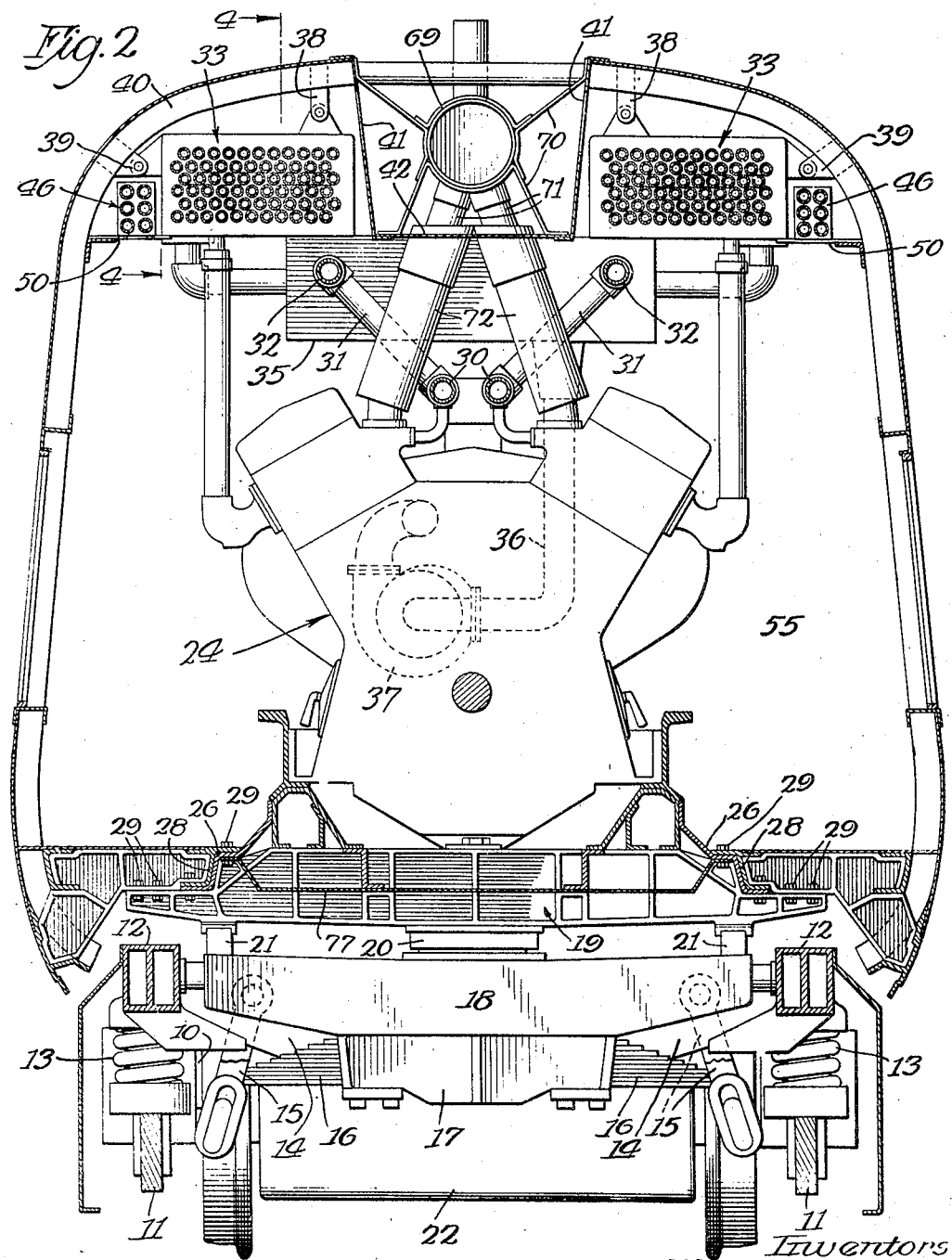

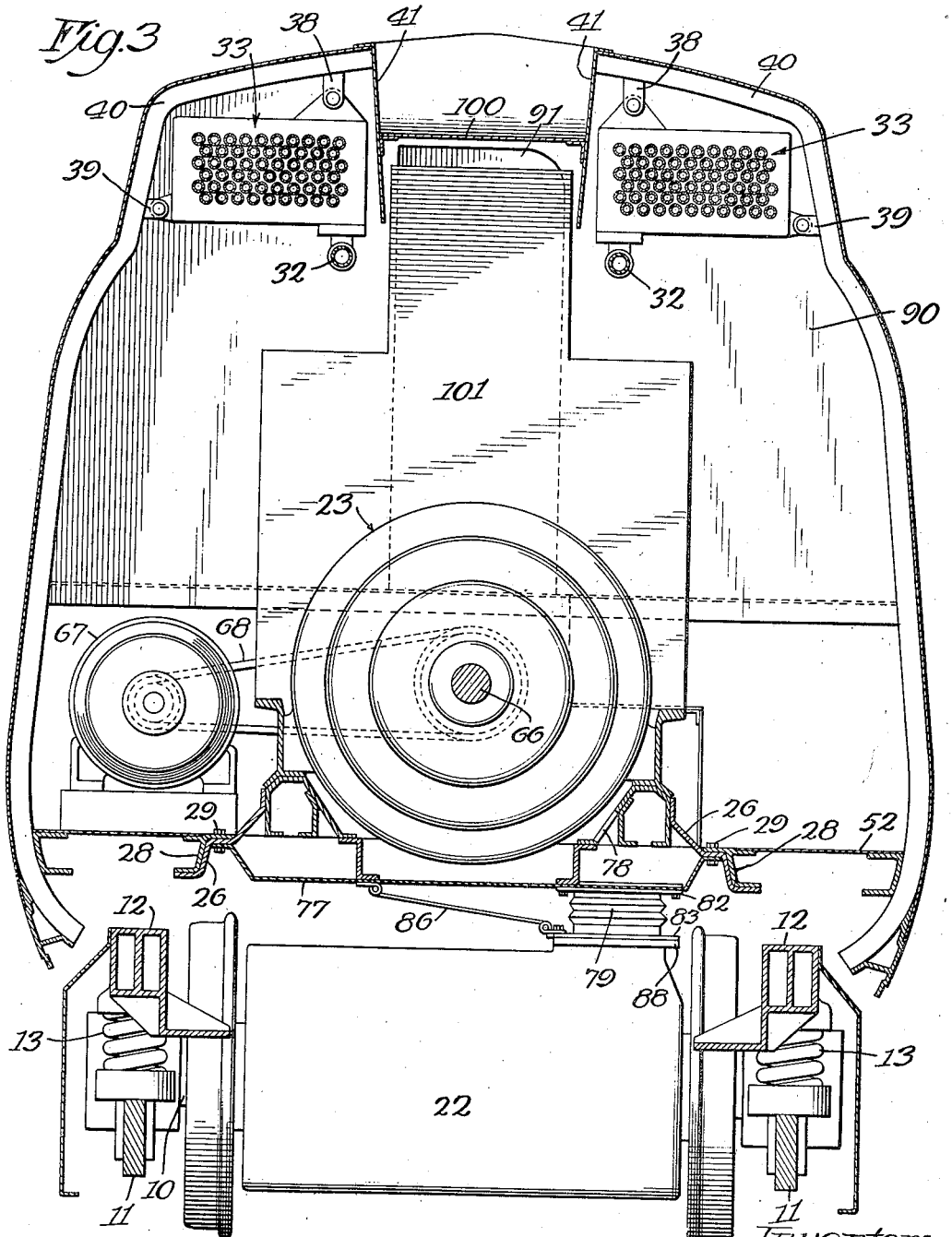

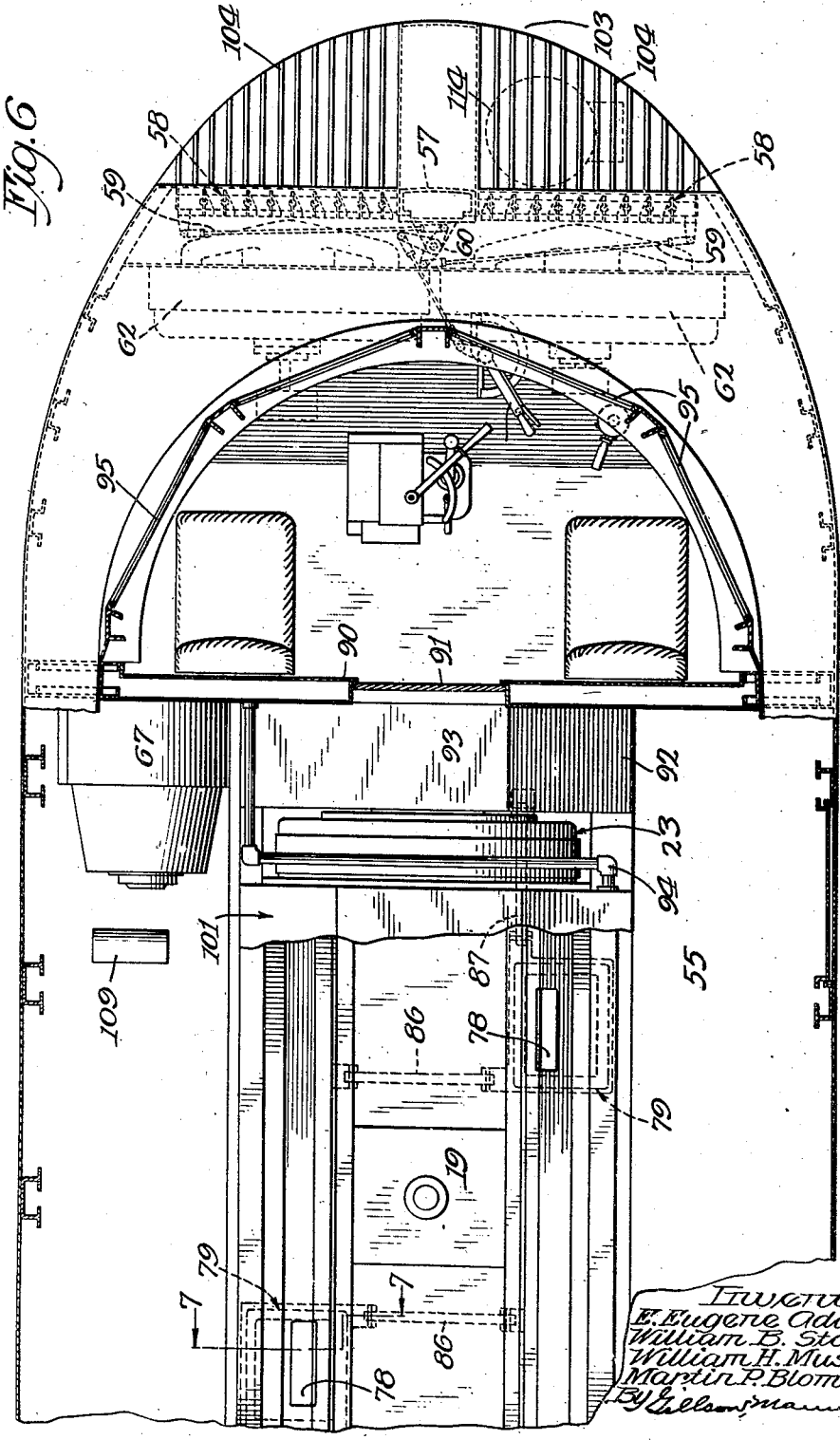

Feb. 4, 1941.    E. E. ADAMS ET AL    2,230,580
MOTOR CAR
Original Filed March 26, 1934    7 Sheets-Sheet 6
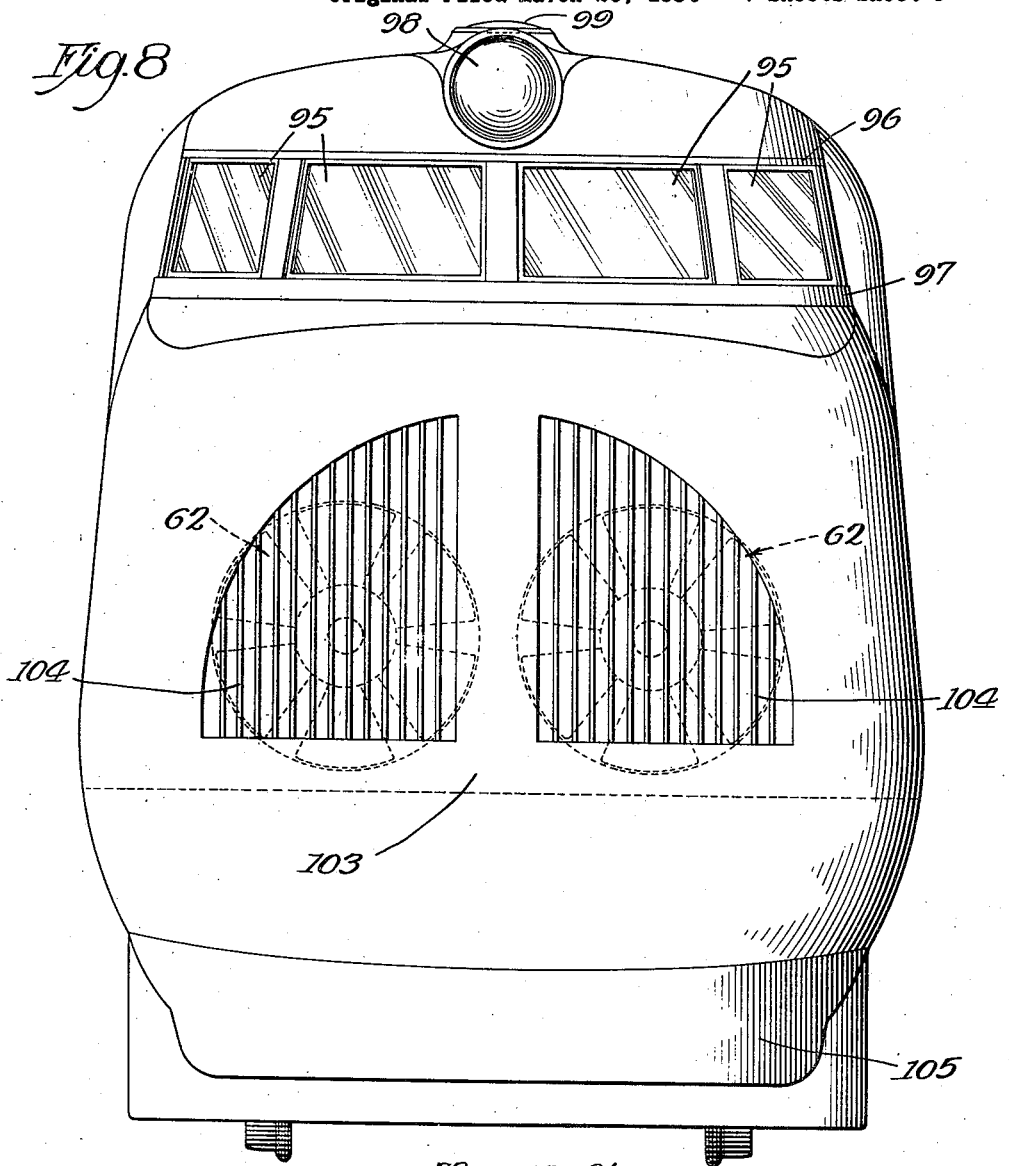
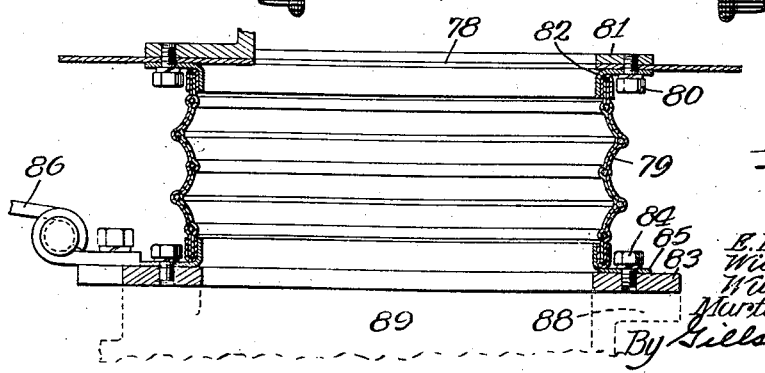

Feb. 4, 1941. E. E. ADAMS ET AL 2,230,580
MOTOR CAR
Original Filed March 26, 1934 7 Sheets-Sheet 7
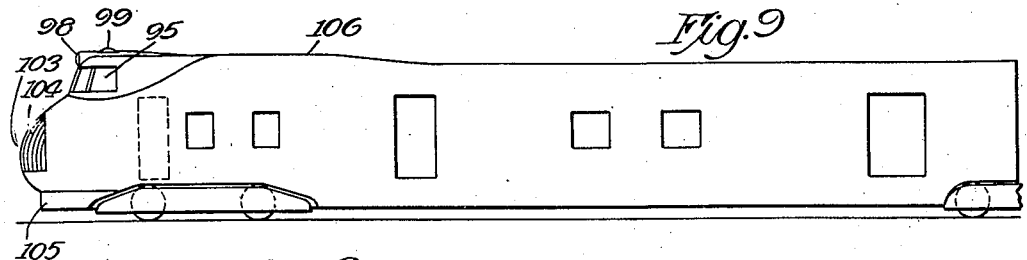
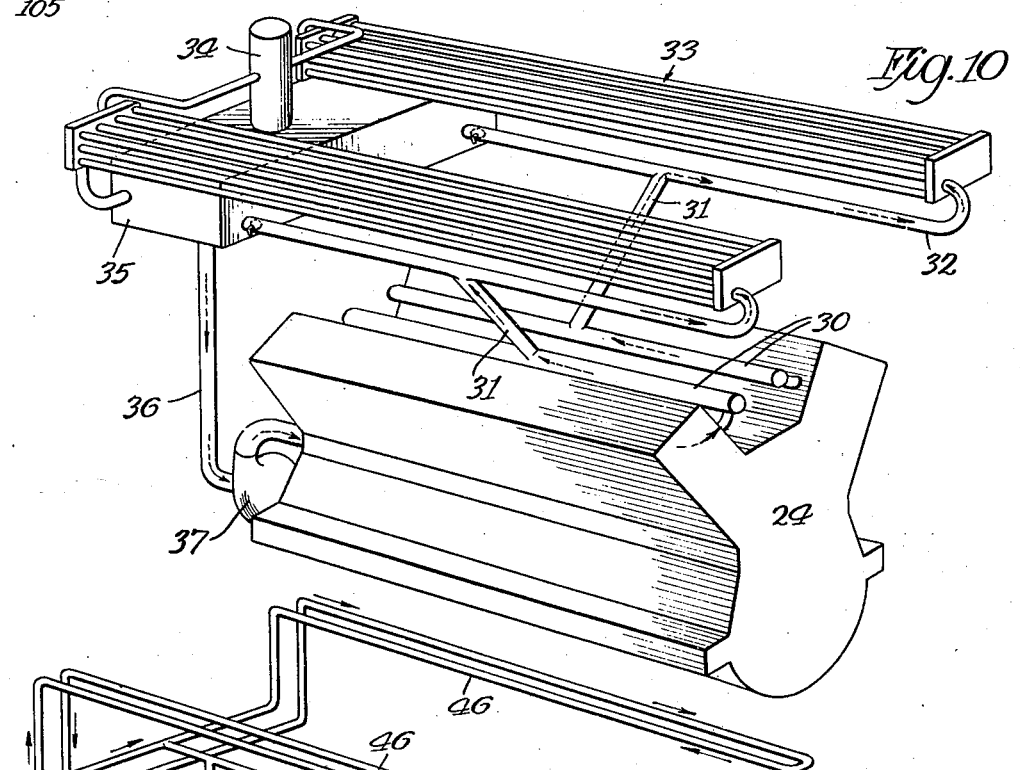
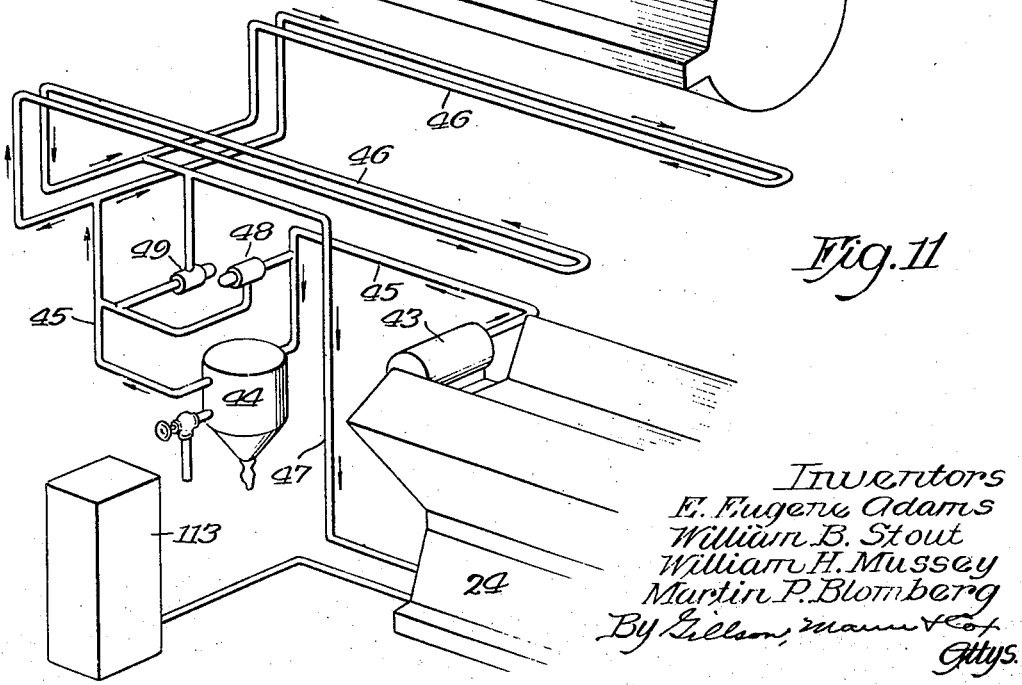
Inventors
E. Eugene Adams
William B. Stout
William H. Mussey
Martin P. Blomberg
Attys.

Patented Feb. 4, 1941

2,230,580

UNITED STATES PATENT OFFICE 2,230,580

MOTOR CAR

Everett Eugene Adams, Chicago, Ill., William B. Stout, Detroit, Mich., and William H. Mussey, Chicago, and Martin P. Blomberg, Hinsdale, Ill., assignors to Pullman-Standard Car Manufacturing Company, Chicago, Ill., a corporation of Delaware Application March 26, 1934, Serial No. 717,424
Renewed November 22, 1938

19 Claims. (Cl. 105—62)

The excess of heat developed by internal combustion engines makes great radiating surface and copious draft necessary for proper cooling. In large cars of conventional shape, the required radiator surface exceeds the available front area and the radiators are transferred to the roof where they offer much resistance and are exposed to extremes of temperature. Familiar illustrations appear in Car Builders' Cyclopedia, 1931, pages 364–371.

Cars shaped with due regard to aero-dynamics at high speed present no suitable front for radiators, nor can the radiators be allowed on the surface contours on account of the resistance they offer as the speed increases.

The principal object of this invention is to provide appropriate cooling within the limits allowed by aero-dynamics and economy of space.

This is accomplished in the particular embodiment here used for illustration (which was made for a high speed three-section articulated rail car equipped with a twelve cylinder 600 H. P. Diesel engine) by placing the radiators overhead inside of the roof adjacent to openings in the sides of a depressed trough along the middle of the roof and swept by draft entering the front and adjustable to suit the varying needs.

Further objects and advantages of the invention will appear as the description is read in connection with the accompanying drawings, in which Fig. 1 is a longitudinal, vertical section through the forward portion of the head car section with the motor and accessories in side elevation;

Figs. 2 and 3 are transverse sections on the lines 2—2 and 3—3 of Fig. 1, looking to the rear and to the front, respectively;

Fig. 4 is a longitudinal section taken on the line 4—4 of Fig. 2;

Figs. 5 and 6 are horizontal sections taken on the lines 5—5 and 6—6, respectively, of Fig. 1, parts, however, being shown in elevation;

Fig. 7 is a transverse section on the line 7—7 of Fig. 6, showing one of the flexible conduits by which cooling air is directed to the electric driving motors on the truck axles;

Fig. 8 is a front elevation of the head car section;

Fig. 9 is a side elevation of the head car section;

Fig. 10 is a diagrammatic representation of the water-cooling system; and

Fig. 11 is a similar representation of the oil-cooling system.

The front end of the head car section is carried by a swing motion truck (Figs. 1 and 2) including wheeled axles 10, supporting equalizer bars 11, which bear the truck side frames 12 on springs 13. The truck transoms 14 have hangers 15 supporting the free ends of cantilever springs 16 fixed in the housing 17 on the underside of the truck bolster 18.

The body bolster 19 is borne by the truck bolster through a center bearing 20 and side bearings 21.

The axles are driven by individual electric motors within housings 22 receiving current from a generator 23 driven by a twelve cylinder Diesel engine which for convenience of description may be termed a motor 24.

The engine and generator, and a number of accessories, are mounted directly on what may be called an engine bed comprising a fabricated extension of the body bolster 19. This bed includes end pieces 25 (Fig. 1) and side pieces 26 (Fig. 2) forming a rectangular frame tapering upwardly and adapted to fit within a similar frame forming part of the car body and including cross sills 27 and stringers 28.

By this construction, the greater part of the power plant is supported directly on the truck and the car body may be removed, leaving the truck and power plant assembly to be rolled away for repairs or replacement. The interlocking of the car body with the motor bed serves to transmit and distribute the stresses and under normal conditions no other fastening will be needed, but to provide against emergencies, they are held together by bolts 29.

As best appears in the diagram, Fig. 10, the cooling water from the jackets of the engine 24 escapes into manifolds 30 connected by risers 31 to pipes 32 leading to radiators 33, connected with a filling pipe 34 and a water tank 35. The cooled water passes down from the tank through a pipe 36 to the pump 37.

The radiators 33 are suspended by hangers 38 and 39 from the carlines 40 and are arranged alongside a depressed trough, including perforated sides 41 and a bottom 42.

As best appears in the diagrammatic view, Fig. 11, the oil for the motor is pumped through a control cylinder 43, connected through a filter 44 by piping 45 leading to radiators 46, which are connected by return pipes 47 to the motor 24. By-passes 48 and 49 serve to shunt out the filter and the radiators, if necessary, to maintain pressure in the system. An oil reservoir tank is indicated at 113.

The oil radiators 46 are arranged between the water radiators 33 and the curving sides of the roof (Fig. 2), where they are suspended by brackets 50.

The operator's cab 51 is raised above the floor 52 of the car section which, with the inclined foot board 53, and the floor 54, of the cab, forms a large air passage leading from the extreme front of the car section into what may be called a motor chamber 55. The inlet at the front is in two parts on each side of the main frame members 56 and 57 (Fig. 5) and each part is controlled by a shutter 58, the two of which are connected by rods 59 with the opposite ends of a lever 60 mounted on a vertical shaft that is rotatable by the hand lever 61 in the cab 51.

Just to the rear of each shutter is a large blower 62 driven by belts 63 from a power shaft 64 connected by a universal joint 65 with the generator shaft 66, which is driven directly by the engine 24. The same shaft 64 drives a lighting generator 67 through a belt 68.

A muffler 69 (Figs. 1 and 2) is mounted within the roof trough on braces 70, and the individual exhaust pipes 71 connect it with the motor through flues or jackets 72 fitted in the bottom 42 of the trough, and enclose the exhaust pipes with liberal clearance.

In operation, a cooling draft of air will enter the front, pass beneath the cab and into the motor chamber 55, dividing at each side of the generator and motor and, rising towards the roof, sweeps over the radiators 33 and 46 and escapes out the perforated sides 41 of the trough. By this means, the entire motor chamber and all the power plant units are continually swept with the cooling air, which divides itself into two streams that concentrate in the area of the radiators at each side of the trough in order to escape. And in escaping, the drafts impinge on the muffler, cooling it, and then striking each other, are deflected directly upwardly along with the exhaust gases.

The intake being directly at the front relieves the otherwise excessive pressure caused by the motion of the train, and the outlet being at the top just to the rear of the point where the roof is highest (see Fig. 1) it is delivered into a low pressure area at high speed, which relieves the drag.

The perforated sides 41 of the roof trough are, in this particular car, the webs of deep top sills which, together with a top 73 and a bottom 74 (Fig. 1) form a duct of the ventilating and air conditioning system. This duct and the trough are separated by a wall 75 just to the rear of which the webs of the sills are provided with several openings 76 to admit heated air from the adjacent radiator surfaces.

Air is also supplied from the motor chamber to cool the electric driving motors within the casings 22 on the truck axles. The rectangular frame constituting the motor bed is closed by two metal plates 77 on each side of the body bolster 19. The air for cooling the electric motors is led through openings 78 (Figs. 3 and 7), in the plates, and through tubular diaphragms 79 to the casings 22. As shown, the upper ends of the diaphragms 79 are secured to the plates 77 by bolts 80 and rings 81 and 82. The lower ends of the diaphragms are secured to sliding rings 83 by bolts 84 and rings 85 (Fig. 7). The rings 83 are secured to the plate 77 by links 86 and 87, arranged at right angles, which hold the lower ends of the diaphragm in fixed relation to the car body, and permit the rings 83 to slide over the flange 88, around the inlet 89, to the motor casings 22.

The operator's cab is separated from the motor chamber at the rear by a bulkhead or partition 90 having a door 91, reached by steps 92 and platform 93, guarded by a rail 94. At the front and the sides the cab is fitted with a number of windows 95 between an upper angle 96 and a lower channel 97 forming a sort of belt rail.

Above the cab, in the center, is a head lamp 98 back of which is a vertically directed signal lamp 99.

Just in front of the muffler (Fig. 1) the bottom 42 of the trough is offset upwardly, as indicated at 100, to make clearance for a high voltage cabinet 101 that sits astride the generator 23 by the door of the operator's cab. The low voltage cabinet 102 is in the left rear corner of the motor chamber (Fig. 5). Other accessories include fuel pumps 107, a hot water heater 108, an air compressor governor 109, a carburetor water storage tank 110, a tachometer 111, driven by a belt 112 (Fig. 1) from the power shaft 64, and a bell 114 in one of the spaces between the shutter 58 and the grilles 104.

The two inlets for air are formed in what may be called, for want of a better term, the rounded nose 103 at the front end of the car, to which is fitted the detachable gratings 104.

Below the nose is a semi-cylindrical skirt, or pilot 105, shaped to prevent the formation of a compression area below the front of the car.

The aero-dynamic outline of the car forms the subject of an independent invention, and it will be sufficient to add here that ample space for the enclosed radiators is provided in the roof by a gentle slope 106 (Fig. 9) on top of the car at the rear of the cab 51.

We claim:

1. In a car, a body comprising a raised cab at the front above an inlet air passage leading to a motor chamber the roof of which has a lengthwise depression with perforated sides forming air outlets, a motor in the chamber, and motor radiators adjacent to the perforated sides of the roof depression.

2. In a car, a body comprising a raised cab at the front above an inlet air passage leading to a motor chamber the roof of which has a lengthwise depression with perforated sides forming air outlets, a motor in the chamber, motor radiators adjacent to the perforated sides of the roof depression, and a fan in the inlet passage driven by the motor.

3. In a car, a body comprising a raised cab at the front above an inlet air passage leading to the motor chamber the roof of which has a lengthwise depression with perforated sides forming air outlets, a motor in the chamber, and a valve in the inlet passage adjustable to vary the draft.

4. In a car, a body comprising a raised cab at the front above an inlet air passage leading to the motor chamber the roof of which has a lengthwise depression with perforated sides forming air outlets, a motor in the chamber, and a valve in the inlet passage, and means operable from within the cab to adjust the valve.

5. In a car, a roof having a trough-like depression with perforated sides forming outlets for cooling draft, a radiator inside the car adjacent to each perforated side of the roof depression, and means to maintain a draft over the radiators and out through the sides of the depression.

6. In a car, a roof having a trough-like depression with perforated sides forming outlets for cooling draft, a radiator inside the car adjacent to each perforated side of the roof depression, a motor in the car, and an exhaust muffler for the motor mounted in the trough.

7. In a car, a roof having a trough-like depression with perforated sides forming outlets for a cooling draft from within the car, an internal combustion engine in the car, and an exhaust muffler for the engine mounted in the trough.

8. In a car, a body having a roof provided with a longitudinal opening, an internal combustion engine in the body, engine radiators located over the engine at roof level on opposite sides of the opening, and means for forcing air over the engine and radiators and thence to the outside atmosphere through the opening in the roof.

9. In a car, a car body including a roof having an opening therein, a raised cab at the front of said body, the rear wall of said cab forming a bulkhead extending substantially across said body, an internal combustion engine rearwardly of said bulkhead, a radiator back of the cab mounted adjacent to the roof above said engine, an air system including a duct beneath the cab, and a blower for causing air to flow through said duct over said engine across said radiator and out of the body through the opening in the car roof.

10. In a car, a body having a roof provided with an opening therethrough, an operator's cab in the forward portion of said body, an engine chamber at the rear of said cab, an engine in said chamber, a radiator in a plane above said engine, a horizontal passage for conducting air from in front of said car to said chamber, means for causing air to flow through said passage, along opposite sides of said engine, over said radiator, out of said car, through said opening, said means maintaining the air within said chamber at slightly superatmospheric pressure.

11. In a railway car, an internal combustion engine, a roof having an opening therein, an exhaust conduit for said engine having a horizontal portion disposed longitudinally of said car above the level of the engine and adjacent said roof opening, longitudinally extending cooling radiators for said engine disposed adjacent said conduit portion on opposite sides thereof and substantially coextensive therewith, said radiators and conduit portion being open to each other throughout substantially the entire length of each, and means including a fan for forcing air through said radiators and through said opening, said air being forced into contact with opposite sides of said exhaust conduit portion for cooling the same after passing through said radiators.

12. In a locomotive, an internal combustion engine, an exhaust manifold for the engine, a body providing a compartment for the engine and having a longitudinal inwardly offset outwardly opening channel longer than the exhaust manifold, means for supporting the manifold within the channel, a cooling means for the engine located proximate the channel, and means for supplying large quantities of cooling air to the channel through the walls thereof from the compartment for cooling the cooling means and the manifold, said air being supplied to the channel in substantial quantities in front of the manifold and to the rear of the manifold.

13. In a locomotive car having a streamlined contour with a raised portion generating an aerodynamic pressure at the front thereof and an aerodynamic vacuum at the top and rearwardly of the front, a fuel burning engine carried by the car, a longitudinal channel along the top of the car in the region of said aerodynamic vacuum and having openings at the sides thereof, an exhaust riser for the engine extending upwardly through the bottom of said channel, and air foil and control means taking cooling air from the aerodynamic pressure region and conveying it over a portion of the engine through the openings to generate a substantially upwardly and rearwardly moving column of air in the channel around the exhaust fumes as they leave the exhaust riser.

14. In a locomotive having a nose movable in air to create a region of aerodynamic pressure in front of it and provided with means to deflect air upwardly and rearwardly from the nose to create a region of partial aerodynamic vacuum at the top and to the rear of the nose, a combustion means for generating motive power and including accessories therefor having heat exchange significance disposed rearwardly of the nose, a channel along the top of the car above the combustion means and provided with an opening from the car interior to the atmosphere, an exhaust riser for the combustion means extending upwardly through the bottom of the channel and to a point in said region of partial vacuum, means for conveying cooling air from said region of aerodynamic pressure over the heat exchangers and exhausting said air through the opening in the channel, and means for mounting said accessories proximate the channel and in the path of said air.

15. In a car having a streamlined nose of varying cross-sectional dimension generating an aerodynamic pressure in front of it and an aerodynamic vacuum at the rear thereof, a compartment in the car, an engine in the compartment, an air conduit opening forwardly adjacent the bottom of the car in the region of said aerodynamic pressure and leading to a low point in the compartment, means for regulating the amount of air passing through the conduit and air outlet openings proximate the top of the compartment in the region of said aerodynamic vacuum, and cooling means for the engine located in the path of air from the conduit leaving the compartment.

16. In a car body, a body comprising a raised cab at the front, an inlet conduit opening forwardly of the cab and leading to the motor chamber the roof of which has a lengthwise depression with perforated walls forming air outlets, a motor in the chamber, motor radiators adjacent to the perforated sides of the roof depression, and fan means for forcing a continuous and regulated current of fresh air through the inlet conduit to the compartment and over the radiators and exhausting same through the perforated sides so that the motor and radiators are bathed with a continuously flowing quantity of cooling and fume removing air.

17. In a car, a body comprising a cab at the front, a forwardly opening inlet air conduit leading to a motor chamber, a motor in the chamber, a roof for the chamber having a lengthwise depression with perforated sides forming air outlets and an aperture located in the lengthwise depression for the exhaust conduit of the motor, motor radiators adjacent to the sides of the roof depression, and a fan generating a continuous and predetermined current of fresh air flowing from the inlet conduit over the motor, the radiators, through the air outlets and over the exhaust conduit.

18. In a locomotive car having a streamlined contour with an upwardly inclined portion generating at longitudinally spaced regions, an aerodynamic pressure and an aerodynamic partial vacuum, a fuel burning engine carried by the car, a longitudinal channel along the top of the car in the region of said aerodynamic vacuum, an exhaust riser for the engine extending upwardly through the bottom of said channel, and air foil means conducting air from the aerodynamic pressure region to the channel for generating a substantially upwardly and rearwardly moving column of air encasing the exhaust fumes from the exhaust riser to relieve the drag of said aerodynamic pressure and vacuum.

19. In a car, an internal combustion engine having an exhaust manifold, a body providing a compartment for the engine and having a longitudinal inwardly offset outwardly opening channel, means for supporting one end of the manifold in the channel, flue means around at least a portion of said manifold for conducting air from the compartment to the channel around the manifold, cooling means for the engine located proximate the channel, and means for supplying large quantities of cooling air to the channel through openings in the walls thereof over said cooling means and manifold.

E. EUGENE ADAMS.
WILLIAM B. STOUT.
WILLIAM H. MUSSEY.
MARTIN P. BLOMBERG.